US011463321B2

(12) United States Patent
Chastain et al.

(10) Patent No.: US 11,463,321 B2
(45) Date of Patent: *Oct. 4, 2022

(54) METHOD AND APPARATUS FOR CREATING A CUSTOM SERVICE

(71) Applicant: AT&T Intellectual Property I, L.P., Atlanta, GA (US)

(72) Inventors: Walter Cooper Chastain, Atlanta, GA (US); Reuben Klein, East Brunswick, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/189,238

(22) Filed: Mar. 1, 2021

(65) Prior Publication Data

US 2021/0184939 A1 Jun. 17, 2021

Related U.S. Application Data

(63) Continuation of application No. 14/970,471, filed on Dec. 15, 2015, now Pat. No. 10,938,665.

(51) Int. Cl.
*H04L 41/14* (2022.01)
*G06F 8/36* (2018.01)
*G06F 9/50* (2006.01)
*H04L 41/00* (2022.01)

(52) U.S. Cl.
CPC .............. *H04L 41/145* (2013.01); *G06F 8/36* (2013.01); *G06F 9/5072* (2013.01); *H04L 41/20* (2013.01)

(58) Field of Classification Search
CPC ......... H04L 41/145; H04L 41/20; G06F 8/36; G06F 9/5072
See application file for complete search history.

(56) References Cited

U.S. PATENT DOCUMENTS

| 5,608,720 | A | * | 3/1997 | Biegel | H04L 41/0226 370/465 |
| 6,848,106 | B1 | * | 1/2005 | Hipp | G06F 9/4843 718/1 |
| 7,747,674 | B2 | | 6/2010 | Barkai et al. | |
| 8,199,670 | B2 | | 6/2012 | Mishra et al. | |
| 8,429,630 | B2 | | 4/2013 | Nickolov et al. | |
| 8,533,674 | B2 | | 9/2013 | Abrams et al. | |
| 8,918,488 | B2 | | 12/2014 | Umbehocker | |
| 2004/0139144 | A1 | * | 7/2004 | Batra | G06F 9/5072 709/200 |
| 2006/0165040 | A1 | * | 7/2006 | Rathod | G06Q 10/10 370/335 |
| 2007/0294364 | A1 | * | 12/2007 | Mohindra | H04L 41/12 709/217 |
| 2008/0201690 | A1 | * | 8/2008 | Lovisa | G06F 8/36 717/107 |

(Continued)

*Primary Examiner* — Chris Parry
*Assistant Examiner* — Hassan A Khan

(57) ABSTRACT

A method and apparatus for creating a custom service in a communication network are disclosed. For example, the method implemented via a processor determines that the custom service does not exist, receives one or more desired functions for the custom service, creates the custom service having the one or more desired functions and modifies one or more network elements within the communication network to perform the one or more desired functions to deploy the custom service.

20 Claims, 5 Drawing Sheets

(56) References Cited

U.S. PATENT DOCUMENTS

| | | | |
|---|---|---|---|
| 2008/0243989 A1* | 10/2008 | Barkai | H04L 41/042 709/202 |
| 2008/0304644 A1* | 12/2008 | Mishra | H04L 65/1096 379/201.12 |
| 2009/0210356 A1* | 8/2009 | Abrams | H04L 43/00 705/400 |
| 2009/0276771 A1* | 11/2009 | Nickolov | H04L 67/1008 718/1 |
| 2010/0198972 A1* | 8/2010 | Umbehocker | G06F 3/0604 709/226 |
| 2011/0060946 A1* | 3/2011 | Gupta | H04L 41/065 714/E11.029 |
| 2011/0138047 A1* | 6/2011 | Brown | G06F 9/5072 715/810 |
| 2011/0161911 A1* | 6/2011 | Schultz | G06F 8/36 709/221 |
| 2011/0209140 A1* | 8/2011 | Scheidel | H04L 41/082 717/172 |
| 2012/0005273 A1* | 1/2012 | Rathod | G06Q 10/10 709/204 |
| 2013/0019015 A1* | 1/2013 | Devarakonda | G06F 9/5072 709/226 |
| 2013/0085889 A1* | 4/2013 | Fitting | G06Q 30/06 705/26.35 |
| 2013/0085899 A1 | 4/2013 | Tyra et al. | |
| 2013/0304616 A1* | 11/2013 | Raleigh | G06Q 20/3267 705/34 |
| 2013/0339510 A1* | 12/2013 | Douglas | H04L 41/5096 709/223 |
| 2014/0120961 A1* | 5/2014 | Buck | G06F 1/329 455/466 |
| 2014/0173594 A1* | 6/2014 | Ng | G06F 9/505 718/1 |
| 2014/0201374 A1* | 7/2014 | Ashwood-Smith | G06F 9/50 709/226 |
| 2015/0046513 A1* | 2/2015 | Elias | H04L 67/51 709/203 |
| 2015/0058459 A1* | 2/2015 | Amendjian | H04L 41/20 709/223 |
| 2015/0063166 A1* | 3/2015 | Sit | G06F 9/541 455/418 |
| 2015/0074279 A1* | 3/2015 | Maes | H04L 67/51 709/226 |
| 2015/0358248 A1* | 12/2015 | Saha | H04L 43/0817 709/226 |
| 2015/0381515 A1* | 12/2015 | Mattson | G06F 16/9024 707/722 |
| 2016/0019636 A1* | 1/2016 | Adapalli | H04L 47/70 705/26.81 |
| 2016/0062746 A1* | 3/2016 | Chiosi | H04L 41/5048 717/104 |
| 2016/0065417 A1* | 3/2016 | Sapuram | G06Q 30/0629 709/223 |
| 2016/0124781 A1* | 5/2016 | Chastain | H04L 41/0893 719/313 |
| 2016/0127478 A1* | 5/2016 | Chastain | H04L 41/5054 709/223 |
| 2017/0124614 A1* | 5/2017 | Aftab | G06Q 30/0631 |
| 2017/0171032 A1* | 6/2017 | Chastain | H04L 41/20 |
| 2017/0339636 A1* | 11/2017 | Buck | H04L 43/16 |
| 2021/0184939 A1* | 6/2021 | Chastain | H04L 41/20 |

* cited by examiner

METHOD AND APPARATUS FOR CREATING A CUSTOM SERVICE

This application is a continuation of U.S. patent application Ser. No. 14/970,471, filed Dec. 15, 2015, (now U.S. Pat. No. 10,938,665) which is herein incorporated by reference in its entirety.

The present disclosure relates to creating services, cataloging services, and selecting services from a catalog for deployment. A method and apparatus are provided that provide an automated process for creating and designing custom services in a software defined network (SDN) or cloud-based platforms.

BACKGROUND

For years, the current model for building communication networks include deploying specific network elements to perform a specific function. The network elements that are deployed can then work together to provide the communication network services.

However, as communication networks require modification due to changes in technology, capacity, demand, and the like, current models for building communication networks are rigid. For example, all new dedicated hardware must be deployed to implement the new functionality or to provide the newly desired services. As a result, scaling communication networks built with the current models is difficult.

SUMMARY OF THE DISCLOSURE

In one embodiment, the present disclosure describes a method and apparatus for creating a custom service in a communication network. For example, the method implemented via a processor determines that the custom service does not exist, receives one or more desired functions for the custom service, creates the custom service having the one or more desired functions and modifies one or more network elements within the communication network to perform the one or more desired functions to deploy the custom service.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

As discussed above, the current models for building communication networks include deploying specific network elements to perform a specific function. The network elements that are deployed can then work together to provide the communication network services.

However, as communication networks require modification due to changes in technology, capacity, demand, and the like, current models for building communication networks are rigid. For example, all new dedicated hardware must be deployed to implement the new functionality or to provide the newly desired services. As a result, scaling communication networks built with the current models is difficult.

Embodiments of the present disclosure provide a method and system for creating a custom service in a communication network. For example, custom services can be created on demand and used to configure network elements within the communication network. The custom services can be stored in a catalog for reuse. This provides a more efficient and automated process for creating new services in a communication network.

Figure 1:
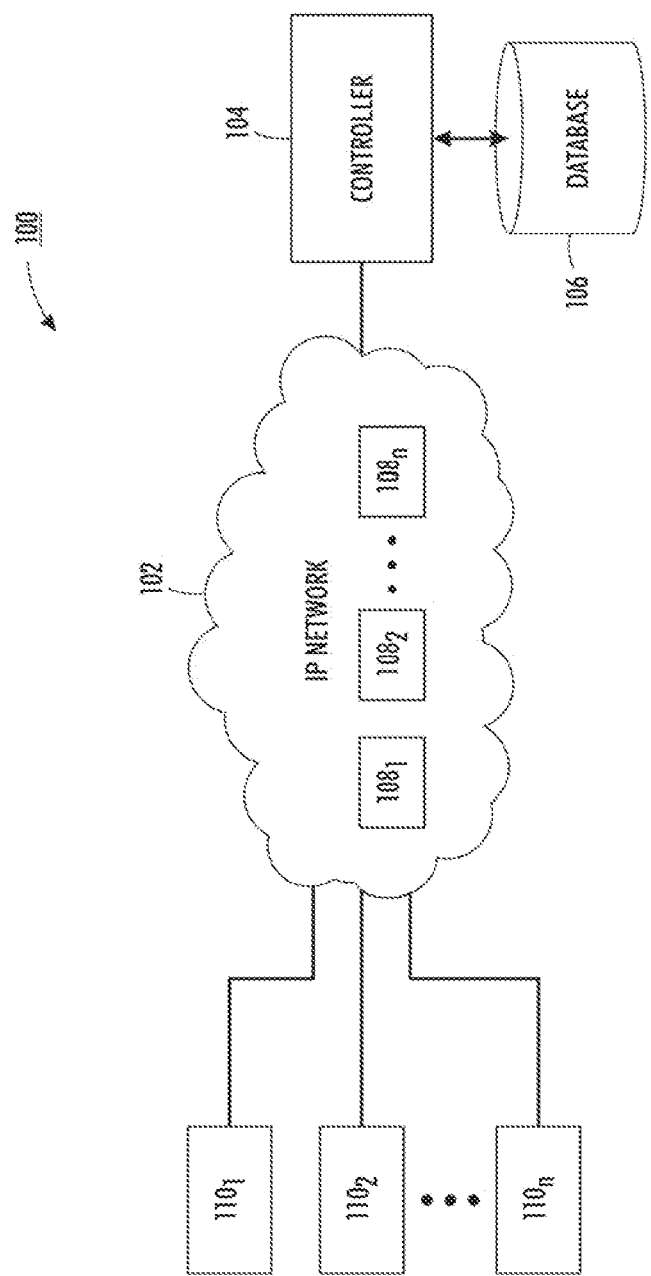
FIG. 1 illustrates an example network related to the present disclosure.

FIG. 1 illustrates an example communication network 100 related to the present disclosure. In one example, the communication network 100 has been simplified for ease of explanation. In other words, the communication network 100 may include additional network elements (not shown), such as gateways, routers, additional access networks, firewalls, switches, and the like.

In one embodiment, the communication network 100 may include an Internet Protocol (IP) network 102 that includes one or more network elements $108_1$ to $108_n$ (herein referred to individually as a network element 108 or collectively as network elements 108). In one embodiment, the network elements 108 may be any type of network element, such as, gateways, routers, border elements, switches, servers, and the like, that are deployed in the IP network 102.

In embodiment, the IP network 102 may be a physical network or a cloud-based network. For example, the IP network 102 may be deployed as a software defined network (SDN) using a European Telecommunications Standards Institute (ETSI) network functions virtualization (NFV). The network elements 108 may be configured to perform various functions and services in accordance with software defined functions to provide services to one or more endpoints $110_1$ to $110_n$ (herein referred to individually as an endpoint 110 or collectively as endpoints 110).

In one embodiment, the communication network 100 may include a controller 104. The controller 104 may be a dedicated computer or machine to perform the functions described herein. The controller 104 may include a processor and a non-transitory computer readable storage medium storing instructions (e.g., the instructions associated with the steps of methods 200 and/or 300 described below) that when executed by a processor perform the functions described herein. One example of a computer dedicated to perform the functions described herein is provided below in FIG. 5.

In one embodiment, the controller 104 may be in communication with a database (DB) 106. The DB 106 may store a catalog of services, service components and resources used to create custom services in the IP network 102. For example, when a request for a custom service is received by the controller 104 (e.g., from a customer via an endpoint 110, from a service provider of the IP network 102, and the like), the custom service may be created from service templates in the DB 106.

However, if the service does not exist, the controller 104 may create the service by combining one or more service components. If one or more service components do not exist, the controller 104 may create the one or more service components from resources.

Figure 4:
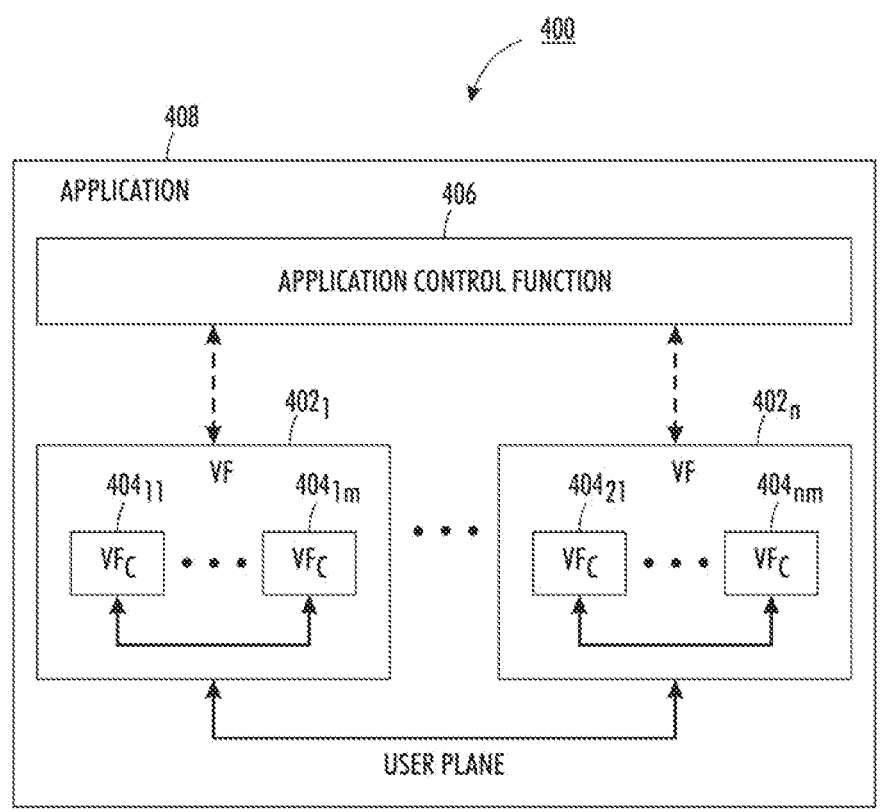
FIG. 4 illustrates a block diagram of an example of a service component and a resource of the present disclosure.

FIG. 4 illustrates an example of a service component 400. The service component 400 may be defined as a combination of one or more applications 408. Each application 408 may be created from one or more resources $404_{11}$ to $404_{nm}$ (herein referred to individually as a resource 404 or collectively as resources 404). In one embodiment, a resource 404 may be defined as a virtualized function component ($VF_C$). A $VF_C$ may be an internal component of a virtualized function (VF) $402_1$ to $402_n$ (herein referred to individually as a VF 402 or collectively as VF's 402) and perform some sub-set of the overall functionality of a VF 402. Alternatively, the resources 404 may be deployed as a physical network function (PNF) that is a physical device that performs a particular function in support of a larger service. In one embodiment, an ETSI VNF may be a type of VF and an ETSI $VNF_C$ may be a type of $VF_C$.

In one embodiment, the application 408 may comprise a set of one or more VFs 402 and an application control function 406. The application control function 406 may control the functions of each VF 402 to help the application 408 run as a single unit to perform the desired functions. The connectivity between the VF's 402 within the application 408, or the $VF_{CS}$ 404 within a VF 402, may be described by an application graph. The relationship between the VFs 402 and the application control function 406 may be described by an application control graph. The application 408 may be instantiated to an infrastructure and provided with network connectivity to become operational.

Referring back to FIG. 1, as noted above, the controller 104 may create a custom service if the service does not exist in the catalog of services stored in the DB 106. The service may be created in a variety of different configurations. In one example, the service may be a basic service. For example, the basic service may include a single application 408 (illustrated in FIG. 4) that has been operationalized and is capable of atomic operation.

In another embodiment, the service may be configured as a segmented service. The segmented service may be chained to other service components 400 to form the segmented service. The segmented service may include a single layer of multiple application control functions 406, one application control function 406 for each service component 400.

In another embodiment, the service may be configured as a composite service. A composite service may be created by chaining together service components 400 in a hierarchical fashion. For example, the composite service may include different hierarchical layers of application control functions 406 for each service component 400 within one of the hierarchical layers.

Figure 2:
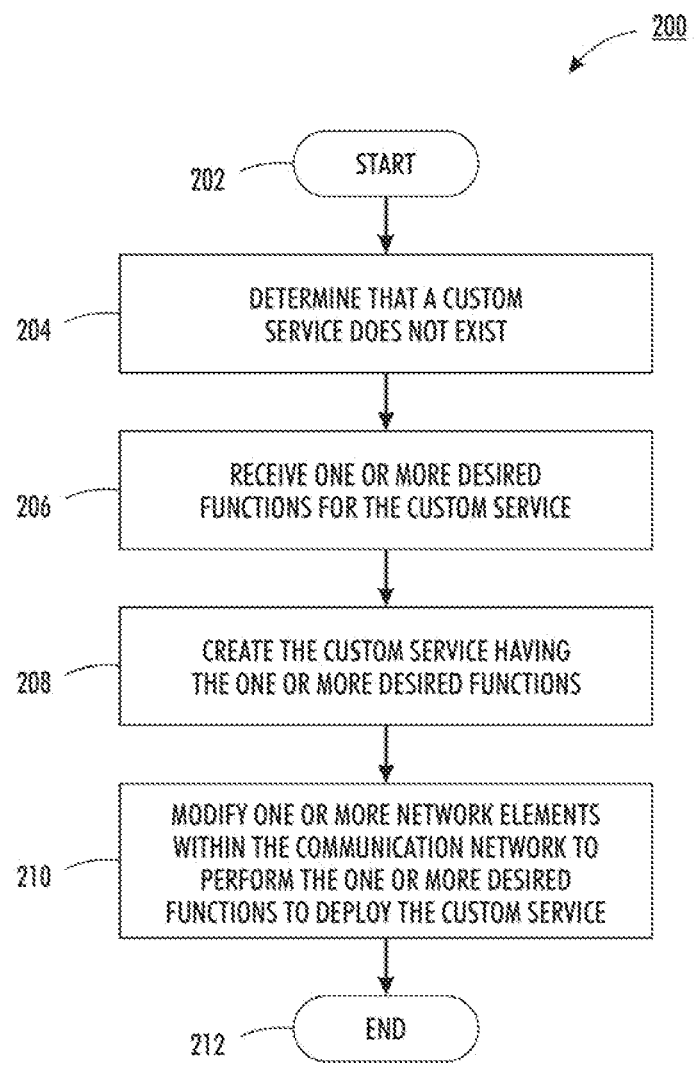
FIG. 2 illustrates a flowchart of a method of the present disclosure for creating a custom service in a communication network.

FIG. 2 illustrates a flowchart of an example method 200 of the present disclosure for creating a custom service in a communication network. In one embodiment, the method 200 may be implemented by the controller 104 dedicated for performing the functions described herein or the computer or processor as described in FIG. 5.

At step 202, the method 200 begins. At step 204, the method 200 determines that a custom service does not exist. For example, a request may be received to create a new custom service for a customer in a communications network (e.g., a SDN network, a cloud-based network, and the like). A catalog of services stored in a database may be searched. However, the requested custom service may not exist in the stored catalog of services so the customer service is created.

At step 206, the method 200 may receive one or more desired functions for the custom service. For example, the custom service that is to be created may be defined. The definitions may include each function that is associated with the custom service that is to be created.

At step 208, the method 200 may create the custom service having the one or more desired functions. For example, the database may be searched to look for one or more service components that are capable of performing each one of the functions. For example, each service component may perform a single function. However, the combination of one or more service components may perform all of the functions of the custom service that is to be created.

However, if the service components do not exist, one or more resources may be used to create the one or more service components that do not exist. In one embodiment, the database may be searched to look for the one or more resources needed to create the one or more service components. If the resources do not exist, then the resources may be developed and/or acquired.

After the custom service is created, the custom service may be transmitted to the database to be stored in the catalog of services. As a result, the catalog of services may continue to grow as new services, new service components and/or new resources are created for new requests.

At step 210, the method 200 may modify one or more network elements within the communication network to perform the one or more desired functions to deploy the custom service. For example, one or more network elements may be configured to perform the one or more desired functions to provide the custom service to an endpoint of a customer that requested the custom service. For example, a controller may send a control signal to one or more network elements that causes a change in the configuration of the one or more network elements in accordance with the functions of the custom service. In one embodiment, "configuration" may be broadly interpreted as a change in one or more parameters, one or more operations, one or more functions, and the like. As noted above, the custom service may include one or more service components that include one or more applications. Thus, the one or more applications of the custom service may be executed on the one or more network elements. At step 222, the method 200 ends.

Figure 3:
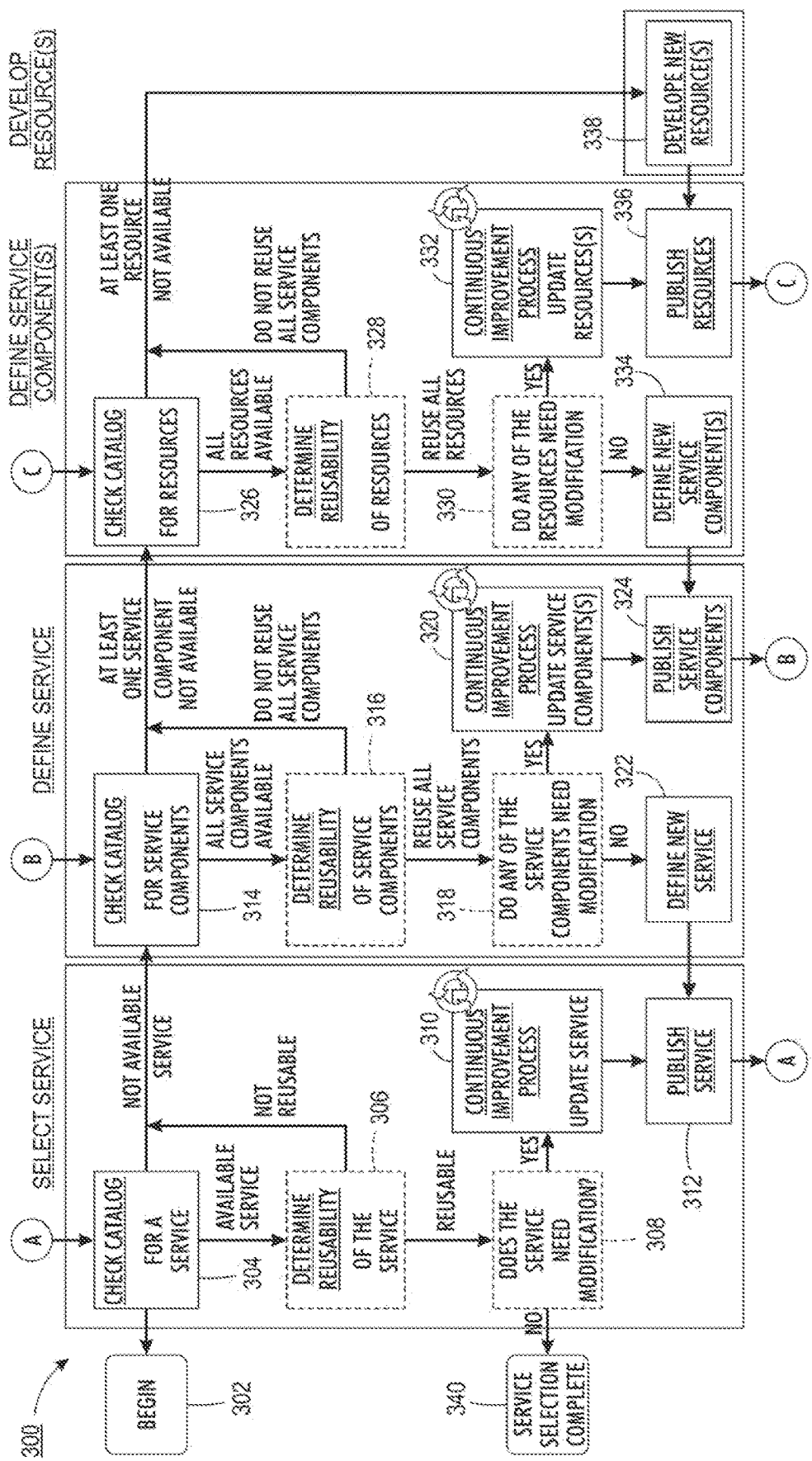
FIG. 3 illustrates a more detailed flowchart of a method of the present disclosure for creating a custom service in a communication network.

FIG. 3 illustrates a more detailed flowchart of an example method 300 of the present disclosure for creating a custom service in a communication network. In one embodiment, the method 300 may be implemented by the controller 104 dedicated for performing the functions described herein or the computer or processor as described in FIG. 5.

At step 302, the method 300 begins. At step 304, the method 300 checks a catalog for a service that is requested. If the service cannot be found in the catalog, the method 300 may proceed to step 314. However, if the service is available, the method 300 may proceed to step 306.

At step 306, the method 300 may determine if the service can be reused. In one embodiment, a service can be reused through sharing or through replication. Sharing may be defined as an existing instance (e.g., already deployed) of the service is selected and shared. Replication may be defined as a new instance of the service is created. If the service can be reused, the method 300 may proceed to step 308.

At step 308, the method 300 may determine if the service needs to be modified. For example, the service may exist. However, certain parameters specific to the current request may need to be modified, while the overall functionality of the service remains the same or unchanged. Modification may include generally adding new functionality, fixing bugs, and various optimizations and enhancements. The modification may be done by configuration or through the addition, removal, or replacement of code. If the service does not need to be modified, the method 300 may proceed to step 340. At step 340, the service selection is completed and the method 300 ends.

However, referring back to step 308, if the service needs to be modified, the method 300 may proceed to step 310. At step 310, the method 300 may update the service. The step 310 may be referred to as a continuous improvement process. The method 300 may then proceed to step 312.

At step 312, the method 300 may publish the updated service. In other words, the updated service may be stored in the catalog of services stored in the database. The updated service, thereby, changes the state of the catalog. The method 300 may then return to step 304 to again check the catalog for the service that is requested. If the service cannot be found in the catalog, the method 300 may proceed to step 314.

However, if the service just updated is found the method 300 proceeds again to step 306, if the service is not reusable, the method 300 may proceed to step 314. Otherwise, the method 300 may proceed to step 308. If the service does not need to be further modified, the method 300 may proceed to step 340. In one embodiment, the steps 304-312 may be referred to collectively as a "select service" process.

At step 314, the method 300 deals with a possibility that a service may be defined based upon a new combination of service components already in the catalog. To begin with, it may check the catalog to determine if one or more service components exist to create the service. If all of the service components needed to create the service are found in the catalog, then the method 300 may proceed to step 316.

At step 316, the method 300 determines if all of the service components that were found are reusable. If any of the service components needed to define a new service are unavailable or not reusable, the method 300 proceeds to step 326 in order to define new service components. However, if all of the service components are reusable, the method 300 may proceed to step 318.

At step 318, the method 300 determines if any one of the service components need to be modified. Similar to the modification of a service, one or more parameters, methods or procedures of a service component may need to be modified in order to make them suitable for the new service without changing the nature of the function performed by the service component. If none of the service components need to be modified, the method 300 may proceed to step 322.

At step 322, the new service or the custom service may be created or defined by the service components. The method 300 may then proceed to step 312.

However, referring back to step 318, if any one of the service components need to be modified, the method 300 may proceed to step 320. At step 320, the method 300 may update one or more of the service components that require an update. The step 320 may be referred to as a continuous improvement process. The method 300 may then proceed to step 324.

At step 324, the method 300 may publish the updated service components. In other words, the updated service components may be stored in the catalog of services stored in the database. The method 300 may then return to step 314 to check the catalog for the service components that are needed to create the new service.

Returning back to step 316, if one or more of the service components cannot be reused, the method 300 may proceed to step 326. Returning back to step 314, if the service component cannot be found in the catalog, the method 300 may proceed to step 326. In one embodiment, the steps 314-324 may be referred to collectively as a "define service" process.

At step 326, the method 300 may check the catalog to determine if one or more resources exist to create one or more service components. If all of the resources needed to create the one or more service components needed to create the new service are found, the method 300 may proceed to step 328.

At step 328, the method 300 may determine if all of the resources are reusable. If all of the resources are reusable, the method 300 may proceed to step 330.

At step 330, the method 300 determines if one or more of the resources need to be modified. Similar to the modification of a service or a service component, one or more parameters, methods or procedures of a resource may need to be modified for a particular service component without changing the function performed by the resource. If none of the resources need to be modified, the method 300 may proceed to step 334.

At step 334, the new service component or new service components may be created or defined by the resources. The method 300 may then proceed to step 324.

However, referring back to step 330, if any one of the resources need to be modified, the method 300 may proceed to step 332. At step 332, the method 300 may update one or more of the resources that require an update. The step 332 may be referred to as a continuous improvement process. The method 300 may then proceed to step 336.

At step 336, the method 300 may publish the updated resources. In other words, the updated resources may be stored in the catalog of services stored in the database. The method 300 may then return to step 326 to check the catalog for the resources that are needed to create the new service component or service components.

Returning back to step 328, if the resource cannot be reused, the method 300 may proceed to step 338. Returning back to step 314, if the resource cannot be found in the catalog, the method 300 may proceed to step 338. In one embodiment, the steps 326-336 may be referred to collectively as a "define service component" process.

At step 338, the method 300 may develop the new resources that cannot be found in the catalog or the existing resources cannot be reused. The new resources can be purchased or acquired from third party vendors or may be developed internally. The method 300 may then proceed back to step 336 to publish the resources. The method 300 may then proceed back through steps 326, 328, 330, 334, 324, 314, 316, 318, 322, 304, 306 and 308 to exit at step 340 where the service selection is complete.

In one embodiment, the method 300 may be executed based on several strategies used in the selection of services, service components or resources or the development of new service components or new resources. For example, one strategy may be based on a goal to reduce time to market. In other words, services, service components and/or resources should be selected from the catalog before creating new ones.

Another strategy may be based on a goal to reduce costs. For example, service templates, service components and/or resources should be reused or adapted whenever possible.

Another strategy may be based on a goal to sustain a competitive advantage. For example, services, service components and/or resources may be continuously improved beyond the initial implementations of the respective services, service components and/or resources and to make improvements available to all potential users.

Another strategy may be based on a goal to maximize efficient use of resources. For example, the grouping of functions when developing resources and when defining service components and services should be optimized to improve performance, improve resource efficiency, and widen scope.

Another strategy may be based on a goal to minimize human dependence. For example, the automation in operations and deployment should be planned for when developing resources and defining service components and services.

Another strategy may be based on a goal to enable a "building block" approach to service design. For example, the principles of modular design should be emphasized when developing resources and defining service components and services.

Another strategy may be based on a goal to increase resiliency. For example, complex state management should be minimized when developing resources and defining service components and services.

As a result, the present disclosure provides an efficient and automated process for creating custom services, cataloging the custom services and enables them for selection in a communication network. The custom services may be used to automatically configure one or more network elements within the communication network to execute the desired functions associated with the custom service and provide the custom service.

It should be noted that although not specifically specified, one or more steps, functions or operations of the methods 200 and 300 may include a storing, displaying and/or outputting step as required for a particular application. In other words, any data, records, fields, and/or intermediate results discussed in the respective methods can be stored, displayed and/or outputted to another device as required for a particular application. Furthermore, steps, blocks or operations in FIGS. 2 and 3 that recite a determining operation or involve a decision do not necessarily require that both branches of the determining operation be practiced. In other words, one of the branches of the determining operation can be deemed as an optional step. In addition, one or more steps, blocks, functions or operations of the above described methods 200 and 300 may comprise optional steps, or can be combined, separated, and/or performed in a different order from that described above, without departing from the example embodiments of the present disclosure. Furthermore, the use of the term "optional" in the above disclosure does not mean that any other steps not labeled as "optional" are not optional. As such, any claims not reciting a step that is not labeled as optional is not to be deemed as missing an essential step, but instead should be deemed as reciting an embodiment where such omitted steps are deemed to be optional in that embodiment.

Figure 5:
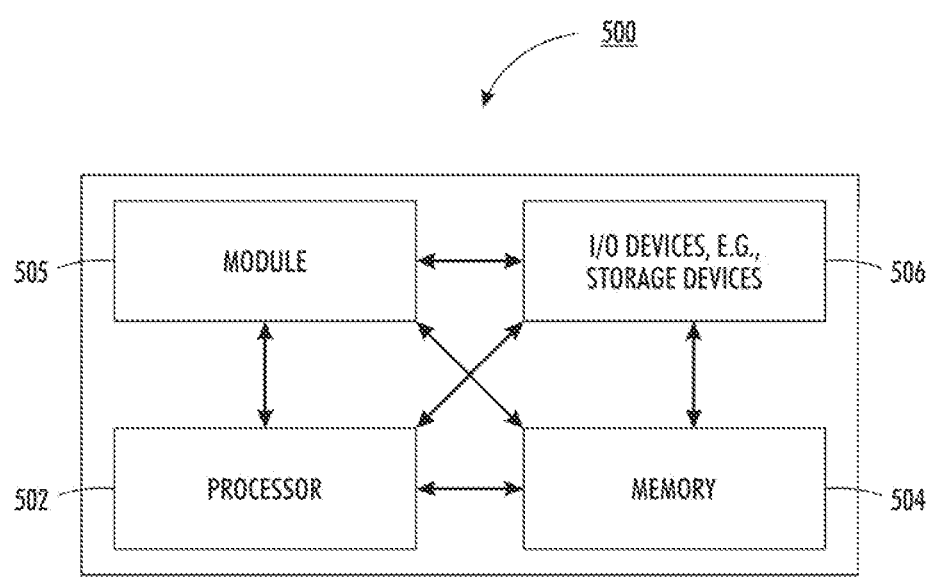
FIG. 5 depicts a high-level block diagram of a computer suitable for use in performing the functions described herein.

FIG. 5 depicts a high-level block diagram of a computer suitable for use in performing the functions described herein. As depicted in FIG. 5, the system 500 comprises one or more hardware processor elements 502 (e.g., a central processing unit (CPU), a microprocessor, or a multi-core processor), a memory 504, e.g., random access memory (RAM) and/or read only memory (ROM), a module 505 for creating a custom service in a communication network, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the methods 200 and 300 as discussed above is implemented in a distributed or parallel manner for a particular illustrative example, i.e., the steps of the above methods 200 and 300, or the entire methods 200 and 300 are implemented across multiple or parallel computers, then the computer of this figure is intended to represent each of those multiple computers.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computer or any other hardware equivalents, e.g., computer readable instructions pertaining to the method(s) discussed above can be used to configure a hardware processor to perform the steps, functions and/or operations of the above disclosed method. In one embodiment, instructions and data for the present module or process 505 for creating a custom service in a communication network (e.g., a software program comprising computer-executable instructions) can be loaded into memory 504 and executed by hardware processor element 502 to implement the steps, functions or operations as discussed above in connection with the illustrative methods 200 and 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for creating a custom service in a communication network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method for creating a service in a software defined network, the method comprising:

receiving, by a processor deployed in the software defined network, from an endpoint of a customer, a request for the service where one or more desired functions for the service do not exist, wherein the service comprises a plurality of service components chained together in a single-layer fashion or in a hierarchical fashion, wherein each of the plurality of service components comprises a grouping of one or more applications, wherein each one of the one or more applications comprises a set of one or more virtual network functions coupled to one of a plurality of application control functions, wherein each of the one or more applications comprises a different application control function of the plurality of application control functions;

determining, by the processor, that the service in the request for the service does not exist;

creating, by the processor, the service having the one or more desired functions, wherein the creating uses a service template, wherein the service template specifies at least one of: an existing service component of the plurality of service components that is capable of being reused or that is capable of being modified, wherein the existing service component is acquired or is internally developed;

modifying, by the processor, in accordance with the service template, one or more network elements within the software defined network to perform the one or more desired functions, wherein the one or more network elements comprise one or more of: a gateway, a router, a border element, a switch, or a server, and wherein the modifying comprises configuring the one or more network elements with the existing service component; and storing, by the processor, the service that is created in a catalog of services.

2. The method of claim 1, wherein the determining comprises checking the catalog of services.

3. The method of claim 1, wherein the storing comprises:
transmitting, by the processor, the service that is created to a database to be stored in the catalog of services.

4. The method of claim 1, wherein the creating comprises:
determining, by the processor, one or more service components of the plurality of service components exist to provide the service; and
combining, by the processor, the one or more service components to create the service.

5. The method of claim 1, wherein the creating comprises:
determining, by the processor, one or more service components of the plurality of service components do not exist to provide the service;
creating, by the processor, the one or more service components via one or more resources; and
combining, by the processor, the one or more service components to create the service.

6. The method of claim 5, further comprising:
transmitting, by the processor, the one or more service components that are created to a database to be stored in the catalog of services.

7. The method of claim 5, wherein the one or more resources comprise a virtual function or a virtualized function component.

8. A non-transitory computer-readable storage device storing a plurality of instructions which, when executed by a processor deployed in a software defined network, cause the processor to perform operations for creating a service in the software defined network, the operations comprising:

receiving, from an endpoint of a customer, a request for the service where one or more desired functions for the service do not exist, wherein the service comprises a plurality of service components chained together in a single-layer fashion or in a hierarchical fashion, wherein each of the plurality of service components comprises a grouping of one or more applications, wherein each one of the one or more applications comprises a set of one or more virtual network functions coupled to one of a plurality of application control functions, wherein each of the one or more applications comprises a different application control function of the plurality of application control functions;

determining that the service in the request for the service does not exist;

creating the service having the one or more desired functions, wherein the creating uses a service template, wherein the service template specifies at least one of: an existing service component of the plurality of service components that is capable of being reused or that is capable of being modified, wherein the existing service component is acquired or is internally developed;

modifying, in accordance with the service template, one or more network elements within the software defined network to perform the one or more desired functions, wherein the one or more network elements comprise one or more of: a gateway, a router, a border element, a switch, or a server, and wherein the modifying comprises configuring the one or more network elements with the existing service component; and storing the service that is created in a catalog of services.

9. The non-transitory computer-readable storage device of claim 8, wherein the determining comprises checking the catalog of services.

10. The non-transitory computer-readable storage device of claim 8, wherein the storing comprises:
transmitting the service that is created to a database to be stored in the catalog of services.

11. The non-transitory computer-readable storage device of claim 8, wherein the creating comprises:
determining one or more service components of the plurality of service components exist to provide the service; and
combining the one or more service components to create the service.

12. The non-transitory computer-readable storage device of claim 8, wherein the creating comprises:
determining one or more service components of the plurality of service components do not exist to provide the service;
creating the one or more service components via one or more resources; and
combining the one or more service components to create the service.

13. The non-transitory computer-readable storage device of claim 12, wherein the storing comprises:
transmitting the one or more service components that are created to a database to be stored in the catalog of services.

14. The non-transitory computer-readable storage device of claim 12, wherein the one or more resources comprise a virtual function or a virtualized function component.

15. An apparatus for creating a service in a software defined network, the apparatus comprising:

a processor; and a computer-readable storage device storing a plurality of instructions which, when executed by the processor deployed in the software defined network, cause the processor to perform operations, the operations comprising:

receiving, from an endpoint of a customer, a request for the service where one or more desired functions for the service do not exist, wherein the service comprises a plurality of service components chained together in a single-layer fashion or in a hierarchical fashion, wherein each of the plurality of service components comprises a grouping of one or more applications, wherein each one of the one or more applications comprises a set of one or more virtual network functions coupled to one of a plurality of application control functions, wherein each of the one or more applications comprises a different application control function of the plurality of application control functions;

determining that the service in the request for the service does not exist;

creating the service having the one or more desired functions, wherein the creating uses a service template, wherein the service template specifies at least one of: an existing service component of the plurality of service components that is capable of being reused or that is capable of being modified, wherein the existing service component is acquired or is internally developed;

modifying, in accordance with the service template, one or more network elements within the software defined network to perform the one or more desired functions, wherein the one or more network elements comprise one or more of: a gateway, a router, a border element, a switch, or a server, and wherein the modifying comprises configuring the one or more network elements with the existing service component; and storing the service that is created in a catalog of services.

16. The apparatus of claim 15, wherein the determining comprises checking the catalog of services.

17. The apparatus of claim 15, wherein the storing comprises:

transmitting the service that is created to a database to be stored in the catalog of services.

18. The apparatus of claim 15, wherein the creating comprises:

determining one or more service components of the plurality of service components exist to provide the service; and combining the one or more service components to create the service.

19. The apparatus of claim 15, wherein the creating comprises:

determining one or more service components of the plurality of service components do not exist to provide the service;

creating the one or more service components via one or more resources; and combining the one or more service components to create the service.

20. The apparatus of claim 19, wherein the operations further comprise:

transmitting the one or more service components that are created to a database to be stored in the catalog of services.

* * * * *